Feb. 12, 1935.  R. V. PROCTOR ET AL  1,991,227
CONTROL VALVE
Filed July 30, 1932  5 Sheets-Sheet 2

INVENTORS
Robert V. Proctor &
William T. Stephens
by their attorneys
Byrnes, Stebbins, Parmelee & Blenko Patented Feb. 12, 1935

1,991,227

UNITED STATES PATENT OFFICE 1,991,227

CONTROL VALVE

Robert V. Proctor and William T. Stephens, Youngstown, Ohio, assignors to The Commercial Shearing & Stamping Company, Youngstown, Ohio, a corporation of Ohio Application July 30, 1932, Serial No. 626,414

14 Claims. (Cl. 277—46)

Our invention relates to valves for controlling the supply of fluid to fluid-operated devices such as hoisting jacks and the like.

It has been proposed heretofore to provide an automatic cut-off for plug valves such that when a fluid-operated device reached the limit of its movement, the increasing pressure in the supply line would reset the valve so that the fluid would be by-passed and no longer delivered to the fluid-operated device. In all such valves of which we are aware, there is an actual movement of the valve in the resetting operation accompanied by a corresponding movement of the valve handle or other manual actuating means. Such movement of the valve actuating means is objectionable, especially if the means is a lever, because of the danger of injury to the operator's hand on sudden resetting movement of the valve. In multiple valves, the actual movement of the valve mechanisms for resetting is also objectionable because the necessary resetting force, which is usually supplied by an auxiliary piston and cylinder, varies depending on the number of valves which have been operated. Since the necessary restoring force varies, the resetting time is likewise variable since the energy available for resetting is substantially constant.

We have invented a valve having a by-passing mechanism which is effective to by-pass actuating fluid supplied to the valve after the fluid-operated device has been extended to its limit, in response to the building up of pressure in the supply line, so as to relieve such pressure and permit continued circulation of fluid through the valve under little or no pressure. According to our invention, the by-passing operation does not require any movement of the valve proper. This means that the actuating mechanism for the valve, whether a lever or hand wheel or the like, is not operated by the resetting of the valve and there is no danger of injury to the operator's hand. When the invention is applied to multiple valves, furthermore, the expenditure of energy required for operation of the by-passing mechanism is constant and independent of the number of valves which have been operated. The time required for by-passing is thus constant and may be made quite small. Since the invention does not require actual movement of the main valves, the friction which would have to be overcome in so doing does not limit the number of valves which can be controlled by a single by-passing mechanism.

In accordance with our invention, we employ a control valve of the tapered plug type. A check valve is incorporated in the main valve casting so as to be traversed by the fluid before it reaches the plug valve. A by-passing valve which is normally maintained closed by a light spring and is preferably of the sleeve or piston type, controls a passage from the valve inlet to the valve outlet which extends around or in parallel with the main passage through the valve which is controlled by the tapered plug. The by-passing valve is controlled by a relief valve responsive to the pressure in the supply line. When the by-passing valve has been operated by the opening of the relief valve, it is held in operated position until the main valve is manually restored, whereupon the by-passing valve is automatically reclosed and conditions restored to normal. The check valve holds the fluid-operated device in extended position after operation of the relief and by-passing valves.

A multiple valve incorporating our invention comprises inlet and outlet ports connecting with high pressure and low pressure passages adapted to supply a plurality of valve plugs in parallel. These plugs control the application of fluid pressure to a plurality of fluid-operated devices. A by-passing passage also branches from the high pressure passage to the low pressure passage and each of the individual valve plugs has a portion for controlling the by-passing passage, which is open when all the valves are in normal position but is closed upon operation of any valve. The check valve aforementioned is incorporated between the inlet port and the high passage. A further by-passing passage is controlled by a by-passing valve such as that previously mentioned, in response to the operation of a relief valve. The by-passing valve is held in operative position until the pressure within the fluid-operated device is removed from the high pressure passage by the manual resetting of all the main valves which have been operated. A bleeder valve then permits the by-passing valve to reset itself.

Another feature of the multiple valve embodying our invention is that similar plugs may be employed to control single acting or double acting hoists merely by reversing the plugs in their bores.

For a complete understanding of the invention, reference is made to the accompanying drawings illustrating a present preferred embodiment of the invention, including a single valve and a multiple valve.

Figure 1:
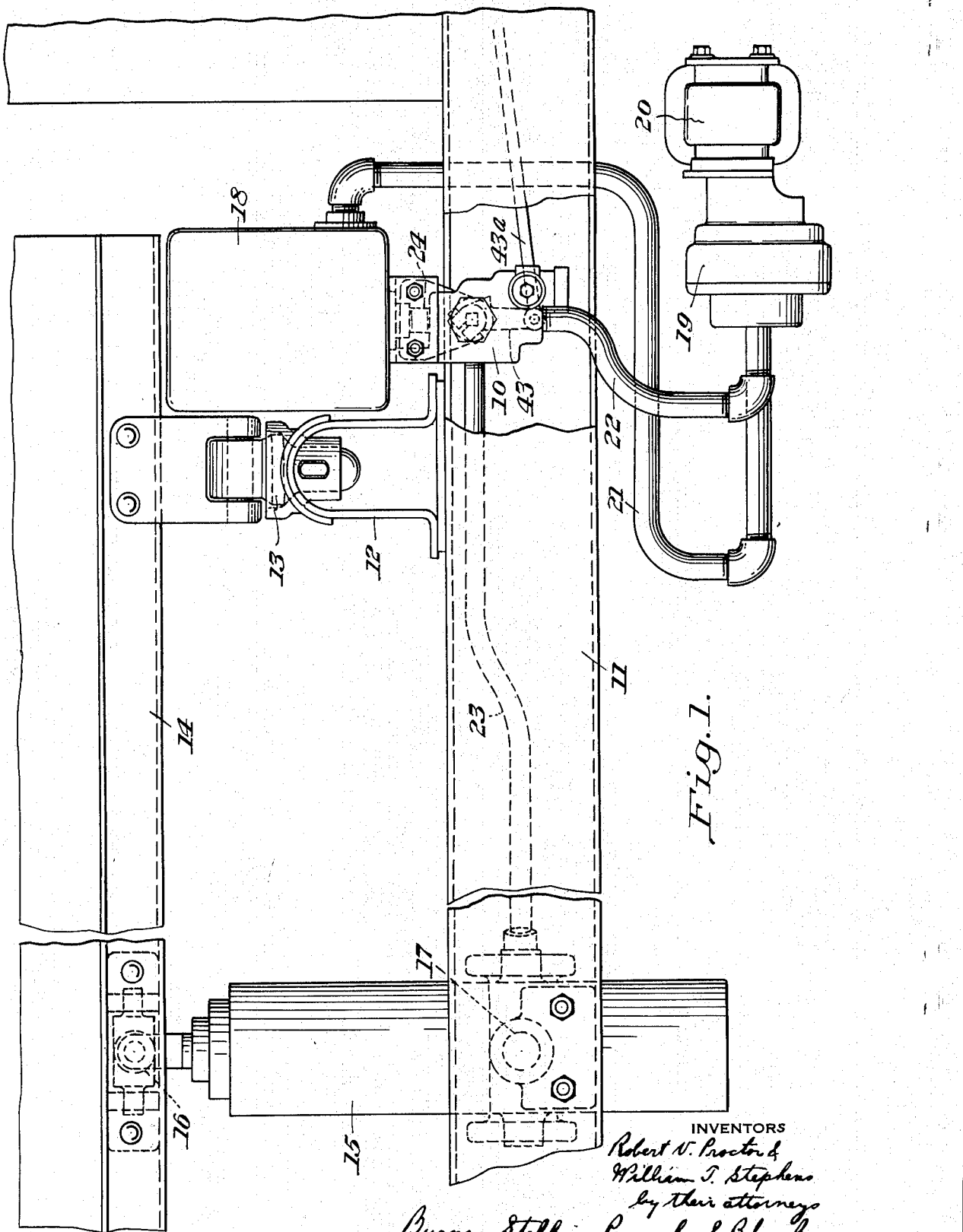
Figure 1 is a partial side elevation showing one application of the invention, namely, the control of the hoisting jack for a tilting vehicle body.
Figure 2:
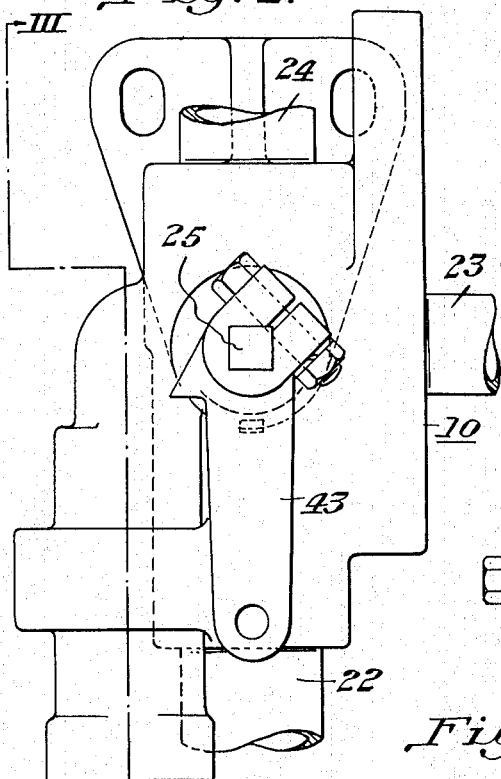
Figure 2 is a side elevation of the single valve.

Referring now in detail to the drawings, and for the present to Figures 1 through 5, the invention is shown as incorporated in a single valve 10. As an example of the uses to which the valve may be put, there is shown in part a motor truck chassis 11 having cross members 12 supported thereon. The cross members, only one of which is shown, are provided with pin and socket hinges 13 for tiltably supporting a dumping body 14. A telescoping jack 15 for hoisting the body 14 is universally trunnioned to the body at 16 and to the chassis at 17. The structure so far described, except the valve 10, is more fully disclosed and claimed in the co-pending application of Camille P. Galanot, Serial No. 257,707, now Patent No. 1,909,341, dated May 16, 1933.

In addition to the valve 10 and the hoisting jack 15, the hydraulic system of which they are a part includes a storage tank 18, a pump 19 and means for driving the pump, such as a power take-off 20, mounted on the transmission of the motor truck. The tank 18 is mounted in any convenient manner on the chassis and supplies fluid, such as oil, through a conduit 21 to the pump 19, whence it is delivered under high pressure through a conduit 22 to the valve 10 which controls the supply of oil to the jack 15 through a connecting conduit 23. A conduit 24 extends from the valve to the tank 18 for returning fluid thereto.

The valve 10 comprises a casting having inlet, supply and exhaust ports for receiving the conduits 22, 23 and 24, respectively. A tapering transverse bore through the casting accommodates a valve plug 25 which is recessed so as to establish communication between different valve ports, when moved to different positions, or to close certain ports. A reciprocating plug might be substituted, of course, for the rotary plug shown. The valve plug bore is intersected by a plurality of passages leading from the various ports. A passage 26 extends from the inlet port to the valve plug bore and accommodates a check valve 27. A short passage 28 extends directly from the valve plug bore to the supply port and the conduit 23. The exhaust port which receives the conduit 24 is in communication with the valve plug bore through a main passage 29 and an auxiliary passage 30.

Figure 4:
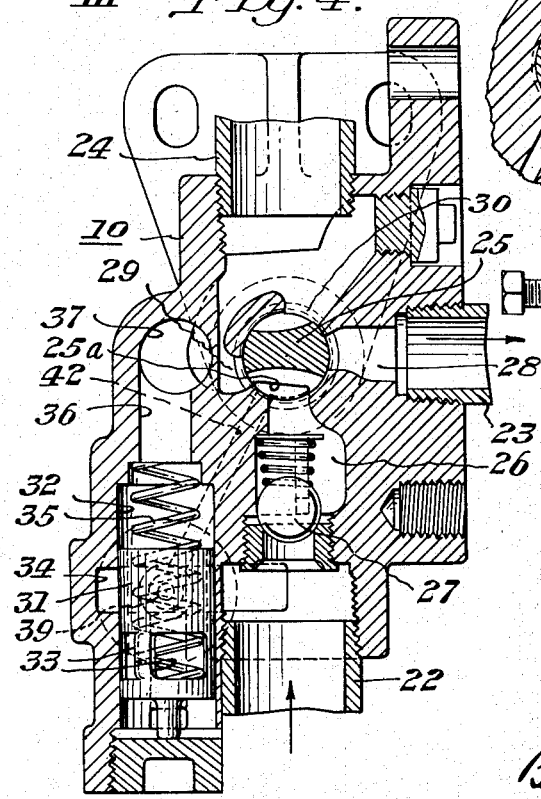
Figure 4 is a sectional view taken along the line IV—IV of Figure 3.
Figure 5:
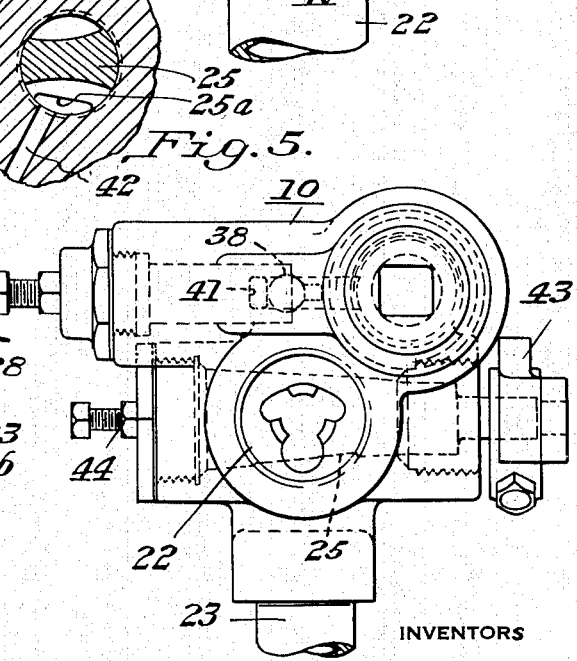
Figure 5 is a bottom view of the single valve with parts removed.
Figure 6:
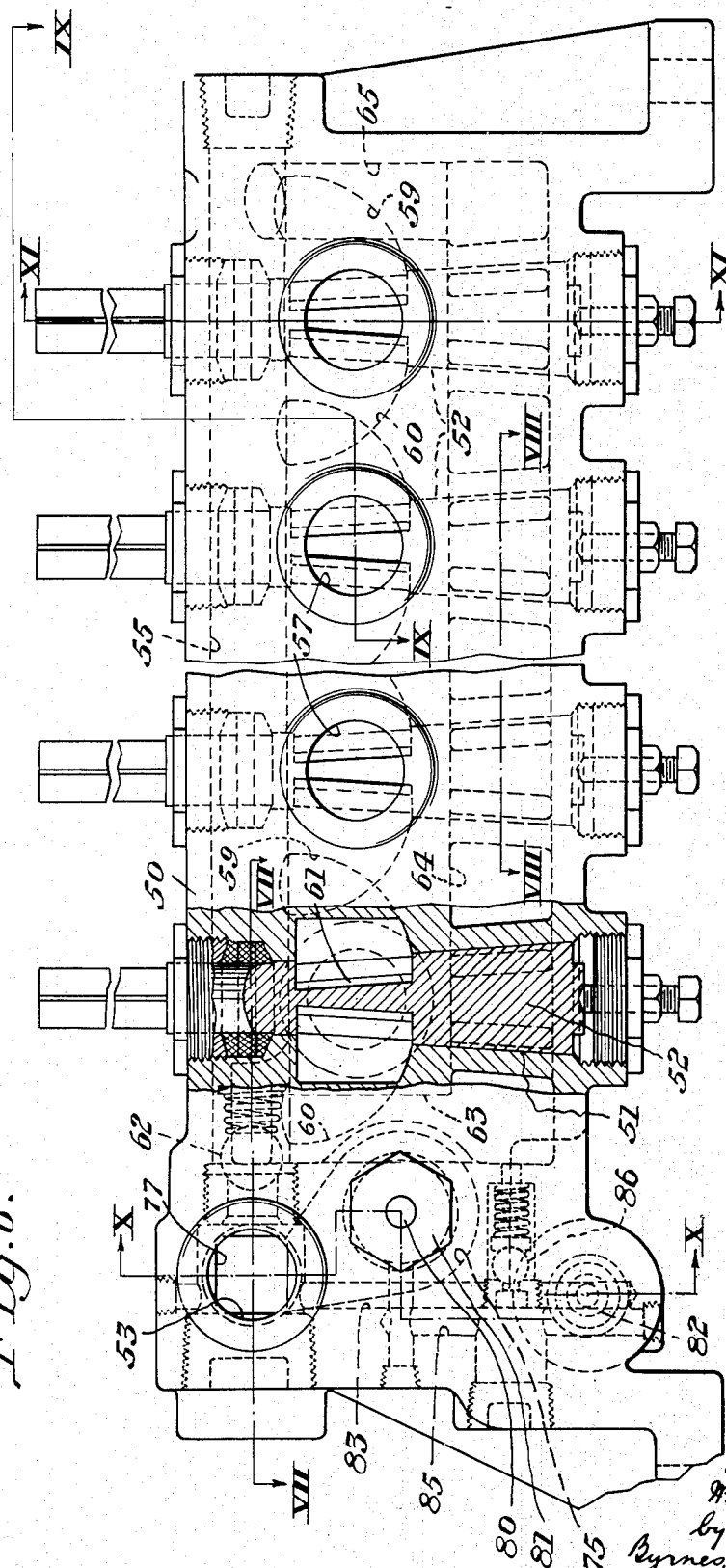
Figure 6 is a side elevation, partly in section, of the multiple valve.
Figure 7:
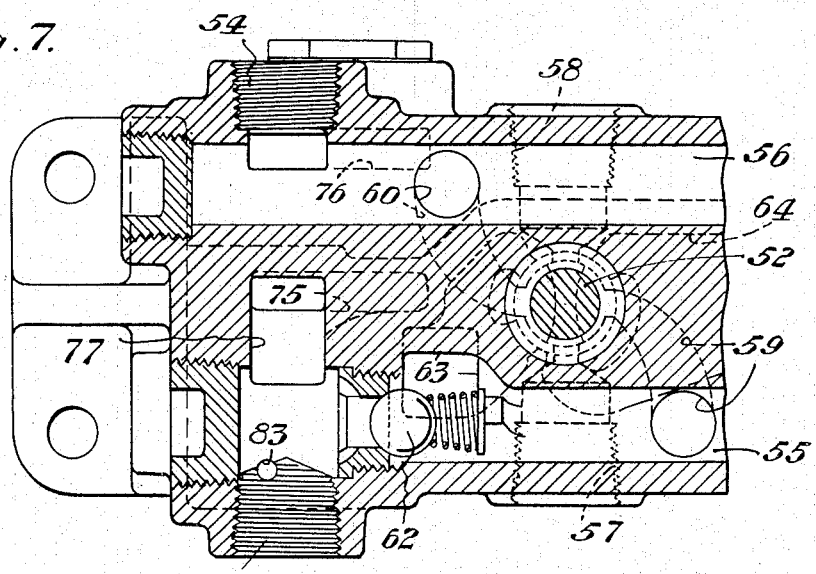
Figure 7 is a sectional view along the line VII—VII of Figure 6.

The valve plug 25, as shown in Figure 4, is in the "holding" position. The passage 28 is shut off and any fluid in the conduit 23 and the hoist 15, or other fluid-operated device controlled by the valve, is trapped therein so that the device is held in operated position. When the valve plug is in holding position, it will be observed that the passages 26 and 29 are in communication through the lower valve plug recess so that additional oil supplied to the valve is by-passed around the fluid-operated device and is returned directly to the tank 18 through the exhaust conduit 24. In systems of the character described, it is customary to operate the pump 19 continuously so as to have operating pressure available at all times. As just explained, however, provision is made for continual circulation of oil under low pressure even when the fluid-operated device is merely being held in completely or partially operated position. By circulating oil continuously under low pressure, the entire system is prevented from overheating and the load on the pump is reduced to a minimum.

It will be obvious that turning the valve plug counterclockwise as viewed in Figure 4, establishes connection between the passages 26 and 28, and at the same time closes the path through both the passages 26 and 29. When the valve plug is in this position, the oil is supplied through the passage 28 of the conduit 23 to the jack or other device for further operation thereof. When the operation of the device has been completed, the valve may be manually returned to the illustrated position. In order to prevent damage to the apparatus which might result from failure to return the valve manually to the holding position shown, however, we provide automatic means for by-passing fluid supplied to the valve after the jack has been fully extended. A check valve 27 prevents escape of the fluid in the jack and connecting conduits and passages even though the valve plug 25 remains in the "raising" position after the oil has been diverted to the by-passing passage by the mechanism about to be described. By turning the valve plug 25 in the clockwise direction as viewed in Figure 4, it is obvious that passages 28 and 30 will be placed in communication, as well as passages 26 and 29. The result of this operation, of course, is to permit the fluid from the cylinder of the jack 15 to flow back to the tank 18 through the conduit 28 while simultaneously permitting the free flow of additional oil from the pump through passages 26 and 29 to the tank.

The automatic means for by-passing oil after full operation of the jack or other device includes a by-passing valve 31 of the piston or sleeve type, and a relief valve. The valve 31 is reciprocable in a cylinder 32 bored in the valve casting, and has its upper end open. It is provided with lateral ports 33 adapted to register with an annular enlargement 34 in the wall of the cylinder 32, which is in communication with the inlet port into which the inlet conduit 22 extends. A resetting spring 35 normally maintains the valve 31 in the illustrated position. An exhaust passage 36 extends from the upper end of the cylinder 32 and has a laterally extending portion 37 in communication with the passage 29.

Figure 3:
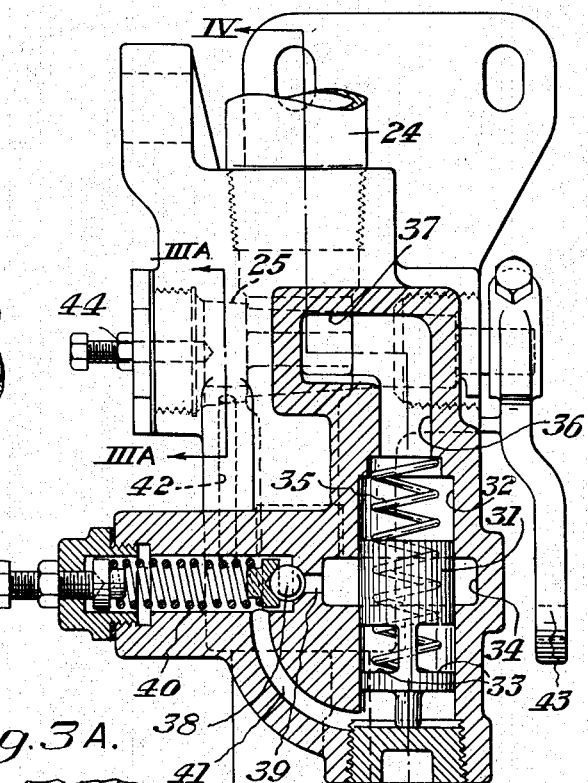
Figure 3 is a sectional view taken along the line III—III of Figure 2.
Figure 3A:
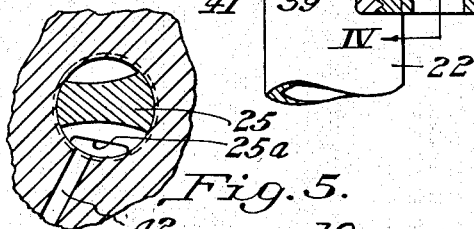
Figure 3a is a partial section along the line IIIa—IIIa of Figure 3.

The relief valve indicated at 38 is subject to the pressure in the supply or inlet conduit 22 through a port 39 communicating with the annular enlargement 34 in the cylinder 32. A spring 40 with the usual adjusting means normally seats the valve 38. A passage 41 extends from the chamber in which the valve 38 is located to the lower end of the cylinder 32. A passage 42 extends from the relief valve chamber to the valve plug bore. As shown in Figure 3a, the valve plug 25 has an auxiliary recess 25a in addition to the main recesses illustrated in Figure 4. The auxiliary recess is located so that it will establish communication between the passage 42 and the passage 29 when the valve plug is moved to the holding or lowering positions in which the passages 26 and 29 are connected.

A lever 43 is secured to the projecting stem of the valve plug 25 and may conveniently be actuated from the cab of the motor truck, for example, by a link 43a and any suitable hand lever. The valve plug is maintained in position in the bore by the adjusting means 44.

The operation of the single valve will now be described, assuming that the valve plug is in lowering position, namely, such that the passages 28 and 30 are connected, and likewise the passages 26 and 29. It will also be assumed that the check valve 27 is opened sufficiently to permit the flow of oil through the valve casting and that the by-pass and relief valves are in their illustrated positions. As long as such conditions exist and the pump 19 is driven, oil will circulate through the valve, as before indicated, having only the pressure of the spring behind the check valve 27 to overcome. This pressure is preferably small so that the pump is practically idle under these conditions. Since fresh oil is supplied to the pump from the tank continuously, there is no danger of overheating.

When it is desired to operate the jack 15 or other similar device controlled by the valve 10, the valve plug 25 is shifted counterclockwise so that the connection between the passages 26 and 29 is broken and the former is connected to the passage 28. Oil is thus supplied under pressure to the hoisting jack, which extends gradually. The hoisting operation may be manually stopped at any point by returning the valve plug to the holding position illustrated in Figure 4, or may be permitted to continue until it is completed. When the hoist extension is completed, the pressure of the fluid in the conduit 22 builds up and is communicated through the enlargement 34 in the cylinder 32 and the passage 39 to the relief valve 38. The relief valve and its spring are dimensioned and adjusted so that the valve will not operate under normal hoisting pressure. When the hoist extension is completed, the pressure will be increased above the normal hoisting pressure and the same result will follow in case the load on the jack is greater than normal. In either case, the fluid pressure will open the valve 38, whereupon oil flows through the relief valve chamber and the passage 41 into the bottom of the cylinder 32. When the valve plug 25 is in the hoisting position, the passage 42 is closed at its upper end. The oil flowing into the cylinder 32 raises the piston valve 31 against the force of the spring 35 until the ports 33 in the valve piston register with the enlargement 34 in the cylinder 32. This immediately relieves the pressure in the conduit 22 since the oil may now flow through the enlargement 34, the ports 33, the piston valve 31 and its open upper end into the passage 36 and thence by the lateral extension 37 thereof, into the exhaust passage 29 which leads directly to the conduit 24 extending to the tank 18. When the pressure is thus relieved, the relief valve 38 is immediately reseated by its spring 40. The oil under the piston valve 31 is thereby trapped and the by-passing valve is thereby maintained in its upper position and permits continued by-passing of oil around the main valve plug. These conditions persist until the valve plug is restored to holding or lowering position.

When it is desired to lower the jack, the valve plug is turned clockwise from the raising position to the holding position illustrated in Figure 4. This movement traps the oil in the jack cylinder but establishes communication between the passages 26 and 29. Similarly, the end of the passage 42 is placed in communication with the passage 29 and the spring 35 is free to force the piston 31 downwardly and eject the oil accumulated thereunder through the passage 42. The initially assumed conditions are thus restored except for the movement of the valve plug 25 to the lowering position to permit the flow of oil back through the passage 28 from the jack to the tank with the continued by-passing of oil from the inlet to the outlet conduit.

Referring now to Figures 6 through 11, similar principles have been used in providing a valve which may be single or multiple, certain features of which are also disclosed and claimed in a copending application of Robert V. Proctor, et al., Serial No. 583,862.

The improved single or multiple valve comprises a casting 50 having a plurality of tapered bores 51 for receiving valve plugs 52 which are similar in general to the valve plug 25 of the single valve. The casting is also provided with inlet and outlet ports 53 and 54 to which suitable supply and exhaust conduits may be connected. High pressure and low pressure passages 55 and 56 extend longitudinally of the casting and are in communication with the inlet and outlet ports, respectively. Supply ports 57 and 58 are connected by short, straight passages through the casting to the valve plug bores. Passages 59 and 60 connect the high pressure and low pressure passages to the bores. Recesses 61 in the upper end of the valve plugs 52 control the connection of the passages 59 and 60 to the supply passages and ports 57 and 58. A check valve 62 is located in the high pressure passage 55.

Figure 8:
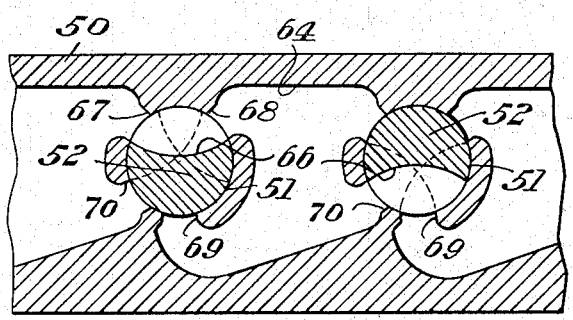
Figure 8 is a sectional view along the line VIII—VIII of Figure 6.

A substantially vertical passage 63 extends downwardly from the high pressure passage 55 to a longitudinal by-passing passage 64. An inclined passage 65 connects the end of the by-passing passage 64 to the low pressure passage 56. The by-passing passage 64 is controlled by recesses 66 in the lower portions of the valve plugs 52. The positions of the recesses 66 in the various plugs control the opening and closing of ports 67 through 70 associated with each plug. When all the plugs are in normal position, as indicated in Figure 8, a continuous path for the flow of oil is provided through the by-passing passage. The oil in the by-passing passage flows through each of the valve plugs in series and after passing through all the plugs, it enters the low pressure passage 56 through the connecting passage 65.

A transverse cylindrical bore 71 in the casting 50 receives a piston valve 72 reciprocably therein. This valve has lateral ports 73 and 74 adapted respectively to register with annular enlargements 75 and 76 in the cylindrical bore 71. The enlargement 75 communicates through a passage 77 with the inlet port 53, while the enlargement 76 similarly communicates through a passage 78 with the low pressure passage 56 and outlet port 54. A spring 79 normally maintains the piston valve in its illustrated position. A projection 80 from the closed end of the piston valve extends through a packing gland 81 to permit mechanical operation of the valve.

A relief valve 82, similar to the valve 38 of the modification of the invention first described, is located in a suitable chamber bored out of the casting 50. A bore 83 extends downwardly from the inlet port 53 and communicates with the short passage 84 leading to the relief valve. From the relief valve chamber, a passage 85 extends to the cylindrical bore 71 for supplying oil thereto to operate the valve 72. A bleeder valve 86 connects the passage 85 with the by-passing passage 64.

Figure 9:
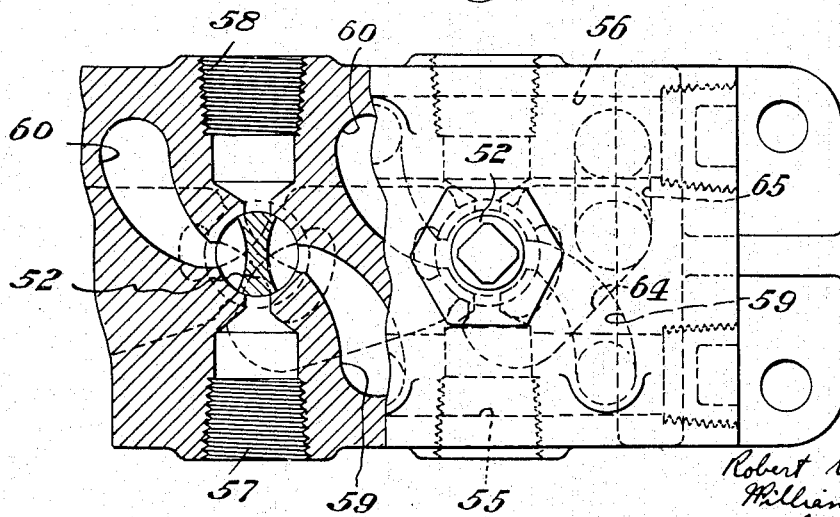
Figure 9 is a sectional view, showing portions in plan, along the line IX—IX of Figure 6.
Figure 10:
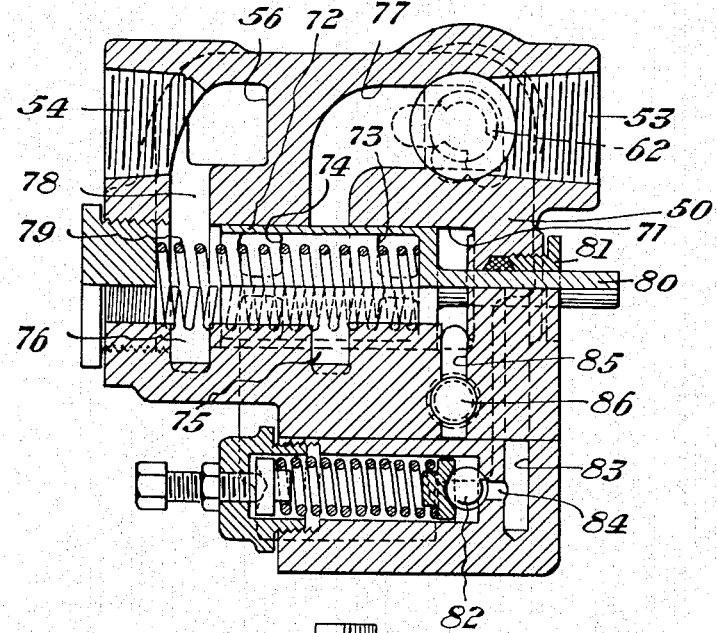
Figure 10 is a sectional view along the line X—X of Figure 6.
Figure 11:
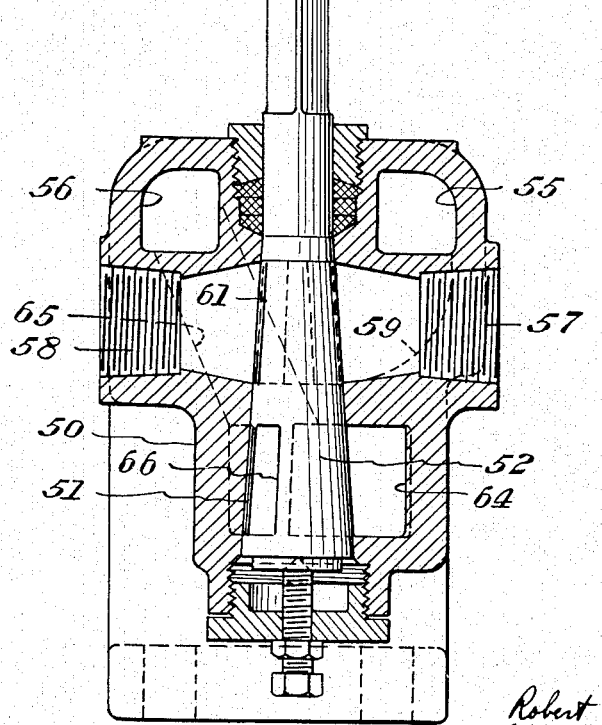
Figure 11 is a sectional view along the line XI—XI of Figure 6.

In describing the operation of the multiple valve, it will be assumed that each of the valve plugs is in one of the positions illustrated in Figure 8. When the lower portions of the valve plugs have the positions there shown, the upper portions are disposed as shown in Figure 9. This is the holding position in which the passages leading from the ports 57 and 58 are closed so that any devices controlled by the valve plugs, which may have been operated are held in operated position.

When all the valve plugs are in holding position, oil supplied to the valve casting under pressure traverses the inlet port 53 and enters the high pressure passage 55 by displacing the check valve 62. Because of the position of the valve plugs, no oil can flow through the passages 59. There is a continuous path for the oil, however, through the passage 63 leading to the by-passing passage 64, the inclined passage 65 and the low pressure passage 56, whence the oil flows through the outlet 54 and returns to the tank, as in the system of Figure 1. While the recesses in the lower portions of certain of the valve plugs may be reversed as shown in Figure 8, there is nevertheless a continuous passage through the valve ports so that circulation of oil under low pressure is permitted.

If it is desired to operate one of the devices controlled by the valve plugs, for example, that shown at the right of Figure 8, the valve plug is shifted counterclockwise until its upper and lower portions have the positions shown in dotted lines in Figures 9 and 8, respectively. This movement of the valve establishes connection between the passage 59 and the port 58 associated with that particular valve plug. Oil under pressure thus flows from the high pressure passage to the fluid-operated device. The lower portion of the valve closes the port 70 in the by-passing passage associated therewith so that oil cannot flow through the by-pass but must flow toward the jack or other device controlled by the valve plug in question. The operation of the device continues until it reaches its limit of operation, whereupon the pressure in the supply line builds up sufficiently to displace the relief valve 82 which is in communication with the inlet 53 by the bore 83. As before stated, the construction and adjustment of the relief valve is such as to prevent opening thereof until abnormal pressures are applied thereto, indicating the completion of the operation of the device or an abnormal load thereupon. The opening of the relief valve 82 permits the oil to flow from the inlet through the passage 85 into the cylinder 71. The piston valve in the cylinder is thereby operated and compresses its spring 79 until the ports 73 and 74 are in registry with the enlargements 77 and 76, respectively, in the cylindrical bore 71. On the occurrence of this condition, the oil in the inlet 53 is by-passed through the passage 79, the piston valve 72 and the passage 78 to the low pressure passage 56 and the outlet 54. The reduction of the pressure in the inlet following the by-passing permits the closing of the valve 82 to hold the by-pass valve in operated position. During the aforementioned operations, the bleeder valve 86 is maintained closed by the pressure in the by-passing passage 64. This pressure, of course, is equal to the hoisting pressure. As long as the valve plug remains in the raising or operating position, the weight of the load is sustained by the pressure on the oil in the high pressure passage 55 and the by-passing passage 64 on the under side of the operated valve.

If the valve is now moved to the holding position as shown in Figures 8 and 9, the by-passing passage is again opened up but the supply port 58 is blocked off. The oil in the by-passing passage is thus relieved of the pressure exerted by the weight of the load. The bleeder valve 86 is thus permitted to open to relieve the oil trapped in the cylinder 71. The spring 79, of course, must be strong enough to operate the valve 86 against the pressure of its spring. During hoisting, the bleeder valve is urged to its closed position, as already stated, and prevents the hoisting pressure from being effective to operate the by-passing valve 72. The normal by-passing passage having been re-established and the relief by-pass having been closed, conditions have returned to normal except that the jack or other device has now been fully operated.

When it is desired to lower or retract the extended jack, the valve plug is shifted clockwise to the dotted line position shown in Figures 8 and 9. The recess in the upper portion of the valve connects the port 58 with the passage 60 leading to the low pressure passage 56. The oil trapped in the device is thus forced back to the tank. The clockwise movement of the valve plug does not cut off the normal by-passing passage since even in the lowering position of the valve, the ports 69 and 70 in the by-passing passage are still in communication.

If it is desired, however, to use the valve plug for the control of a pair of double acting cylinders arranged so that when one is extended the other is retracted, this may be accomplished by reversing the valve plug 180° in its bore, as shown to the left in Figure 8. The operation of the valve when moved both directions from such position is the same as that of the reversed plug except that turning the left-hand plug in Figure 8 in either direction closes the normal by-passing passage so that pressure is developed in the high pressure passage 55 for operating another jack. In the counterclockwise position, therefore, the reversed valve plug at its upper portion would connect the port 57 with the passage 60 so as to permit reverse flow of the fluid therethrough to the tank while conveying fluid under pressure through the port 58. Conversely, when the valve is shifted clockwise, the port 58 is connected to the passage 60 for retraction of the jack, for example, connected thereto, while the port 57 is connected to the high pressure passage 59 so that a jack connected thereto would be extended.

In the several figures of the drawings, there are shown a number of auxiliary bores and passages, some of which are closed by suitable plugs. These are necessarily formed in the machining of the casting but are not described specifically since it is thought their function will be obvious from the drawings.

The valve shown in Figures 1 through 6 is chiefly intended for use to control jacks on trailers where it is difficult to provide a mechanical connection for resetting a valve when the jack has reached its limit, the valve being mounted on the tractor drawing the trailer. For this reason, it is desirable to rely on the increase in pressure in the supply line for resetting. Although the single valve is shown on a motor truck, it is generally possible to provide a mechanical reset for valves so mounted although it is, of course, feasible to use the pressure resetting as well. The multiple valve shown in Figures 6 through 11, however, is generally to be preferred where a plurality of jacks are to be controlled, for example, the jacks for hoisting the bodies of a truck and trailer combination. In such arrangement, it is sometimes desirable to permit mechanical tripping of the by-passing valve and for that reason the projection 80 on the piston valve 72 is provided. Any suitable mechanical means may be employed to push the projection 80 inwardly to operate the by-pass valve when conditions require the operation thereof.

It will be apparent from the foregoing description that the invention provides a valve having means for diverting oil from a fluid-operated device when the latter has reached the limit of its movement and return the oil to the storage tank, without restoring the operating handle or lever of the valve. The possibility of the operator's hand being injured by sudden resetting of the valve lever is thus obviated. Other advantages are the fact that, in a multiple valve, the time required for resetting is the same whether one or more valves have been operated. The multiple valve is further advantageous because it permits the concentration of the control of a number of different devices within the reach of a single operator. Since the resetting takes place as soon as the first valve operated is restored to holding position, any number of other valves can then be operated before shifting the valve to the lowering position. As stated, the multiple form of the valve may have only a single plug and thereby constitute actually a single valve.

Although we have illustrated and described herein but two embodiments of our invention, it is obvious that numerous changes in the construction described and illustrated may be made without departing from the spirit of the invention or the scope of the appended claims.

We claim:

1. In a valve, a casing having inlet, supply and exhaust ports and a plug controlling the connection of said ports, a by-passing valve in said casing for connecting the inlet and exhaust ports, a relief valve subject to the pressure in the inlet port for causing the operation of the by-passing valve, and means effective for causing the by-passing valve to close when the valve plug is shifted to connect the inlet and exhaust ports.

2. A valve comprising a casing having inlet, supply and exhaust ports, a plug in said casing for controlling the connection of said ports, an auxiliary valve in said casing for connecting the inlet and exhaust ports, a relief valve responsive to a predetermined pressure in the inlet for admitting operating fluid to the auxiliary valve, said relief valve being effective after operation of the auxiliary valve to prevent resetting thereof, and a recess in said plug for releasing the fluid behind said auxiliary valve when the valve plug is moved to connect the inlet and exhaust ports.

3. A valve structure comprising a casing having inlet, supply and exhaust ports, a valve plug for controlling the connection of said ports, a spring-closed piston valve for connecting the inlet and exhaust ports, a relief valve for admitting operating fluid to the piston valve upon the occurrence of a predetermined fluid pressure in the inlet port, said relief valve having means for reseating it on the drop in pressure in the inlet resulting from the operation of the piston valve, and means controlled by the movement of the valve plug for releasing the fluid behind the piston valve to permit closing of the latter under the influence of its spring.

4. In a valve structure, a casing, inlet, supply and exhaust ports in the casing, a valve plug therein for controlling the connection of said ports, a by-passing valve for connecting said inlet and exhaust ports, said by-passing valve comprising a piston reciprocable in a cylindrical bore in the casing, a relief valve for admitting operating fluid to said piston upon the occurrence of a predetermined pressure in said inlet, said relief valve having means for reseating it upon the drop in pressure in the inlet resulting from the operation of the piston by-passing valve whereby the latter is held in operated position, means responsive to the rotation of the valve plug for releasing the fluid behind the piston valve, and means for restoring the latter to its initial position.

5. In a multiple valve, a casing having inlet and exhaust ports, a plurality of valve plugs rotatable in bores in said casing, high pressure and low pressure passages communicating with said inlet and exhaust ports and said valve plug bores, a by-passing passage extending from said high pressure passage to said low pressure passage through said bores, each of said valve plugs having portions adapted to close said by-passing passage.

6. In a valve, a casing having inlet and exhaust ports, a valve plug seated in a bore in said casing, supply ports adapted to be placed in communication with said inlet and exhaust ports by said valve plug, a by-passing passage extending from the inlet to the exhaust port and closed by operation of one valve plug, a by-passing valve, and means responsive to a predetermined pressure in the inlet for operating the by-passing valve.

7. A valve comprising a casing having inlet, supply and exhaust ports, and a valve plug for controlling the connection of said ports, a by-passing passage, said plug having means for closing said passage, a check valve between the inlet and the valve plug, a piston type by-passing valve reciprocable in said casing, and means for supplying operating fluid thereto only upon the occurrence of a predetermined pressure in said inlet.

8. In a multiple valve, a casing, inlet and exhaust ports in said casing, high pressure and low pressure passages extending from said ports, supply ports in said casing, and valve plugs rotatably seated in bores in the casing for connecting the supply ports to the high pressure and low pressure passages, a by-passing passage extending from the high pressure passage to the low pressure passage, each of said plugs having portions controlling said passage, a by-passing valve of the piston type, means for admitting fluid to the by-passing valve piston upon the occurrence of a predetermined pressure in the inlet, and trapping said fluid behind the piston upon the drop in inlet pressure resulting from the operation of the by-passing valve, a passage connecting the piston chamber with the by-passing passage, a bleeder check valve in said passage for preventing operation of the by-passing valve by the pressure in the by-passing passage, and means for resetting the by-passing valve, said means being effective to force the fluid behind the piston through said bleeder valve.

9. A valve comprising a casing, a plurality of valve plugs therein, inlet, supply and exhaust ports in the casing connectible through said plugs, a by-passing passage connecting the inlet and exhaust ports, said passage being closed by operation of any one plug, a by-passing valve, and means responsive to the pressure in the inlet for operating the by-passing valve.

10. In a multiple valve, a casing, a plurality of valve plugs journaled therein, inlet, supply and exhaust ports in the casing, a normally open by-passing passage connecting said inlet and exhaust ports, said passage extending through each of said plugs, high pressure and low pressure passages extending from said inlet and exhaust ports for connection to said supply ports on rotation of said plugs, said plugs being effective to close said by-passing passage when rotated in at least one direction, for building up pressure in one of said supply ports.

11. In a valve, a casing, inlet and exhaust ports in the casing, a by-passing passage connecting said inlet and exhaust ports, a check valve between the inlet and the passage, a by-passing piston valve, pressure responsive means for operating said piston valve, a passage connecting the piston chamber with the by-passing passage, a check valve normally closing said last-mentioned passage to prevent premature operation of said by-passing valve by forcing the fluid behind the piston through said last-mentioned passage and its valve.

12. In a valve structure, a casing having inlet, supply and exhaust ports, valve plugs rotatable in the casing for connecting said ports, a by-pass passage through said casing controlled by each of said valves, a by-passing piston valve, pressure responsive means for causing actuation of the piston valve, and means responsive to the movement of one of said plugs to a position such that it cuts off its supply ports from the inlet port, for resetting the piston valve.

13. In a multiple valve, inlet, supply and exhaust ports, identical valve plugs rotatable in bores in said casing for controlling the connection of said ports, certain of said plugs controlling a single hydraulic device and other plugs controlling a plurality of devices, the plugs controlling a single device being disposed in their bores reversely to the plugs controlling a plurality of devices.

14. A multiple valve comprising a casing, a plurality of valve plugs rotatable therein, inlet, supply and exhaust ports in the casing connectible to each other through said plugs, a by-passing passage connecting the inlet and exhaust ports, said passage being closed by operation of any one of said plugs, a second by-passing passage, a by-passing valve therein, and means responsive to the pressure in the inlet for operating the by-passing valve.

ROBERT V. PROCTOR.
WILLIAM T. STEPHENS.